Feb. 25, 1958 — F. W. HIGGINS — 2,824,708
MEANS FOR ATTACHING A STRAND TO A ROTARY MEMBER
Filed Dec. 11, 1953 — 3 Sheets-Sheet 1

Inventor:
Frank W. Higgins
By
Attorneys.

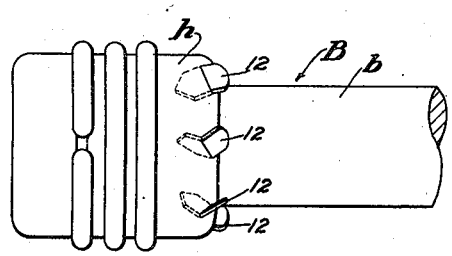
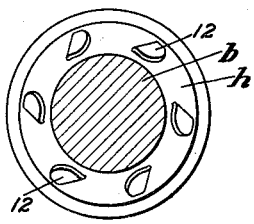
Fig. 5.  Fig. 6.
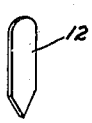
Fig. 7.
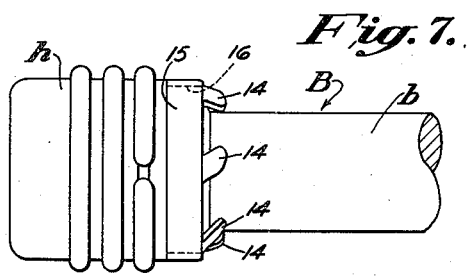
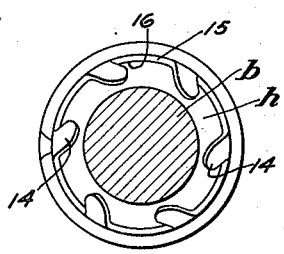
Fig. 8.  Fig. 9.
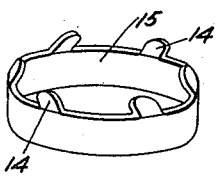
Fig. 10.
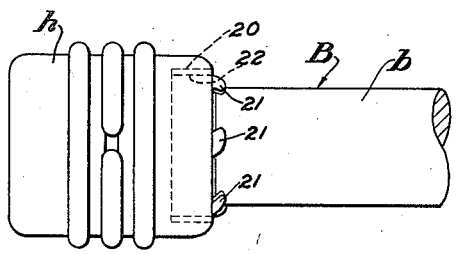
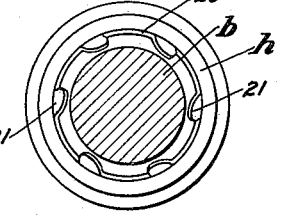
Fig. 11.  Fig. 12.
Inventor:
Frank W. Higgins
By
Attorneys.

Feb. 25, 1958  F. W. HIGGINS  2,824,708
MEANS FOR ATTACHING A STRAND TO A ROTARY MEMBER
Filed Dec. 11, 1953  3 Sheets-Sheet 3

Inventor:
Frank W. Higgins
By
Attorneys.

United States Patent Office 2,824,708
Patented Feb. 25, 1958

2,824,708

MEANS FOR ATTACHING A STRAND TO A ROTARY MEMBER

Frank W. Higgins, Cranston, R. I., assignor to Universal Winding Company, Boston, Mass., a corporation of Massachusetts Application December 11, 1953, Serial No. 397,683

3 Claims. (Cl. 242—125.1)

This invention relates to improvements in bobbins and other cores on which attenuated textile materials may be wound and more particularly to improved means for attaching the end of a strand of yarn to the bobbin or core for winding it thereon.

In the present specification and claims the term "bobbin" is used in a general sense to apply to any type of core or container for strand material whatever its shape, and the term "yarn" is employed to include all varieties of filamentary material.

As herein shown and described the present improvements are applied to a conventional type of bobbin for holding weft or filling yarn, and also to a rotary member or mandrel on which the strand is to be wound for transferring it from one holder to another or from a partly exhausted bobbin to remove the remainder of the yarn therefrom.

One object of the invention is to provide improved means for catching and holding the end of a strand of yarn or the like to attach it to a bobbin or other rotary member for winding it thereon.

Another object is to provide means of the type specified particularly adapted for use with weft or filling bobbins wound on automatic winding machines in which the completed bobbins are doffed and fresh bobbins donned on the winding spindles to render the operation of the machine continuous without manual manipulation.

Another object is to provide means on the bobbin or other yarn container in the form of teeth or prongs under which the yarn strand may be drawn and held so that when the bobbin is rotated the end of the yarn will be attached thereto for causing it to wind thereon.

Further objects of the invention are set forth in the following specification which describes several preferred forms of construction of the device, by way of example, as illustrated by the accompanying drawings. In the drawings:

Fig. 5 is a view similar to Fig. 2 showing a modified form of the teeth or prongs which act to catch and hold the yarn strand;

Fig. 6 is a part-sectional end view of the same;

Fig. 7 is a detailed view of a type of brad adapted to be driven into the head of the bobbin and bent to form the teeth or prongs;

Fig. 8 is a view of a modified form of the teeth or prong construction shown as applied to the head of a bobbin;

Fig. 9 is an end view of the same;

Fig. 10 is a perspective view of a band or annulus formed with teeth or prongs integral therewith and adapted to be applied to the head of the bobbin as shown in Fig. 8;

Fig. 11 is a view of the head end of a bobbin showing a different method of applying the tooth-carrying annulus to the head of the bobbin;

Fig. 12 is a part-sectional end view of the same;

In automatic bobbin winding machines at present in use bare bobbins are fed into the machine and donned in connection with the winding spindle to be held between axially-alined rotatable centers, one of which is driven to rotate the bobbin for winding yarn thereon. In accordance with a common practice the end of the strand to be wound is placed across a cupped spindle-center and pinched by the head of the bobbin held theerin to attach the yarn to the bobbin for winding it thereon. This method of fastening the yarn to the bobbin has not been found entirely satisfactory for unless the strand is placed accurately across the cupped center of the winding spindle and held under the head of the bobbin with considerable pressure it is liable to slip and become detached when the winding is started.

To avoid this condition and other deficiencies of previous methods of attaching the end of a strand of yarn or the like to a bobbin or other core prior to winding it thereon the present invention provides for positively gripping the yarn to the head of the bobbin to provide a secure attachment of the strand thereto.

While the present invention is particularly adapted for use with automatic winding machines it may also be employed with winders of other types; for example, machines in which the end of the yarn is fastened manually to the bobbin or in other apparatus where it is necessary to wind the yarn onto a mandrel or holder to withdraw it from a partly denuded bobbin such as a bobbin-stripper.

Figure 1:
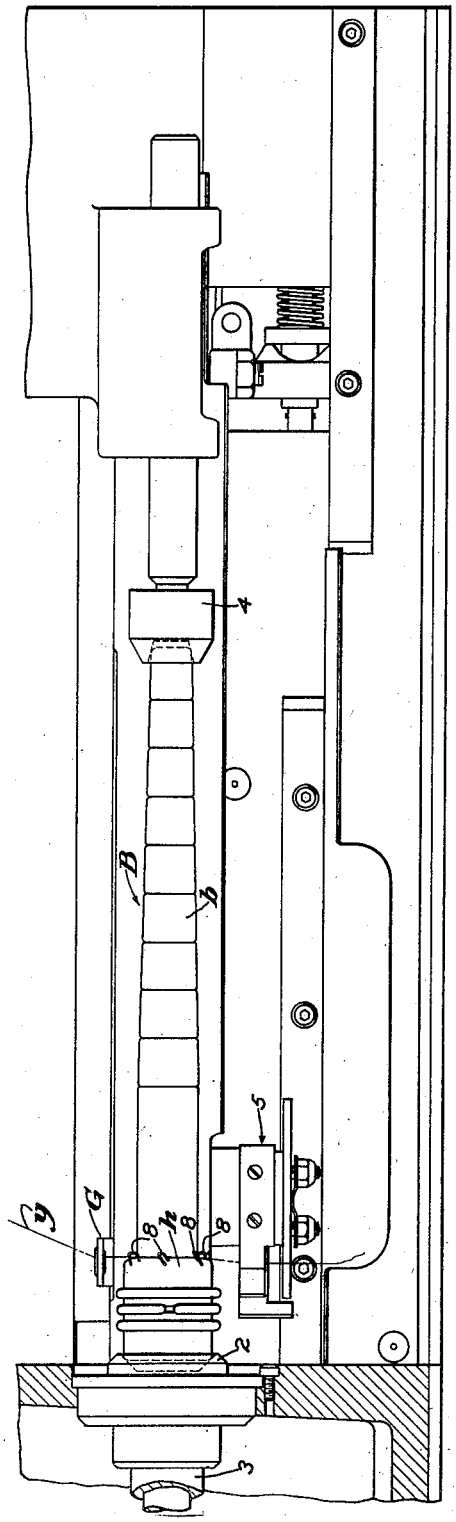
Fig. 1 is a side elevational view of a portion of an automatic bobbin-winder showing a bobbin embodying the present improvements mounted on the machine with a strand of yarn positioned for attachment thereto prior to winding it on the bobbin.

The essential elements of an automatic bobbin-winder are illustrated in Fig. 1 of the present drawings as comprising means for donning empty bobbins in connection with the winding spindle and attaching the end of the yarn thereto to start the winding operation. In a machine of the type described the bobbin B is usually mounted with its head inserted in the hollow center 2 on the end of the rotary winding spindle 3 and its opposite end held by a spindle-center 4 rotatable in an outboard bearing or tail-stock on the winding machine. A supply of empty bobbins is contained in a magazine above the winding spindle with automatic donning means provided for individually placing the bobbins between the spindle-centers 2 and 4 in position for winding the yarn thereon. The outer spindle-center 4 may be mounted for axial movement with means for withdrawing it from the tip end of the bobbin B to doff the latter when it is filled with yarn, and thereafter it may be moved in the opposite direction for engaging the tip of a newly donned bobbin to force its head or butt into the cupshaped center 2 whereby to mount the bobbin for rotation by the spindle 3.

In an automatic bobbin-winder described and illustrated in United States Letters Patent No. 2,638,936, issued May 19, 1953, a traveling clip, shown at 5 in Fig. 1, cooperates with the yarn-guide G for taking the end of the supply yarn, after the trailing end of the doffed bobbin has been severed therefrom, to carry said end back along the barrel b of the bobbin B for attaching it thereto at a point adjacent the head h of the bobbin. The present invention is particularly adapted for use as strand-attaching means for machines of the type shown in Fig. 1 of the present drawings and described above, but it is to be understood that the device may be used for other yarn cores or holders whether or not automatic means are employed for carrying the yarn to said attaching means.

Figure 4:
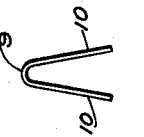
Fig. 4 is a detailed view of one of the wire staples adapted to be driven into the head of a bobbin to provide teeth or prongs for catching the end of the yarn strand and attaching it thereto.
Figure 3:
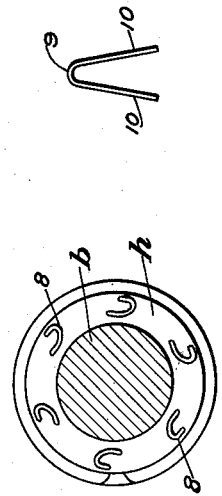
Fig. 3 is a part-sectional end view of the same.
Figure 2:
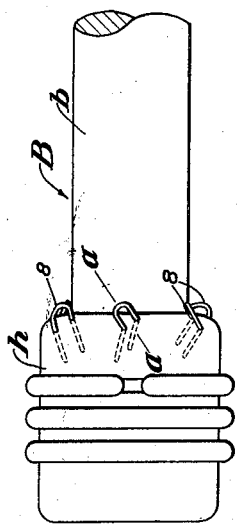
Fig. 2 is an enlarged view showing a portion of a filling bobbin with one preferred form of the present invention applied thereto.

In general, the present invention consists in providing a plurality of teeth or prongs spaced around the head h of the bobbin and projecting angularly from the end of the head or other rotary element while being inclined inwardly toward the bobbin axis and also at an angle across said axis. One convenient method for forming the teeth or prongs 8 is illustrated in Figs. 2 to 4 as by driving U-shaped wire staples into the head of the bobbin or other element and bending their projecting end portions downwardly. The staples 8 may be of inverted V-shape as shown in Fig. 4 with circular portions 9 connecting their legs 10 which project in divergent relationship therefrom. The staples 8 are driven into the enlarged butt or head h at the end of the bobbin B with their legs disposed in parallel relationship extending at an angle across the axis of the bobbin and their circular ends projecting slightly beyond the head.

After the staples have been driven into the head h of the bobbin B in this manner their circular ends are bent downwardly towards the axis of the bobbin at an angle of approximately 45° to the forward face of the head and also inclined across the axis of the bobbin at approximately the same angle. As shown in Figs. 2 and 3 the projecting ends of the staples will thus stand at an angle of approximately 45° to the flat face of the head and also at 45° to the axis of the bobbin as indicated at a—a in Fig. 2. This angular disposition of the ends of the teeth or prongs 8 is most important to provide that after one or more teeth have been rotated across the strand of yarn y to grip it (Figs. 1 and 15) it will ride over the remaining tongues without interference therefrom, as more fully explained hereinafter.

As another satisfactory method of forming the inclined teeth or prongs on the head of the bobbin B, small brads 12 such as shown in Fig. 7 may be used in place of the staples 8. The brads 12 may be sharpened at one end to adapt them to be driven into the head h of the bobbin B at an angle of 45° to the axis thereof with their rounded ends projecting therefrom and then bent downwardly at an angle of 45° to the flat face of the head. Weft bobbins are commonly constructed of wood but in some cases they are molded from plastic and in still other instances have paper or fiber barrels with plastic heads applied thereto. Either of the materials, wood or plastic, is suitable for receiving the legs of the staple 8 or the sharpened ends of the brads 12 and a fixture may be used for feeding and driving the prong elements into the head of the bobbin to provide for setting them at the proper angles.

Figs. 8 and 9 illustrate another method of applying the teeth or prongs to the bobbin. In this modified form of construction the teeth 14 are constructed integral with an annular band 15 of metal or other material such as plastic. The teeth 14 project from the rim of the annulus 15 and are inclined both inwardly and at an angle to its axis as shown most clearly in Fig. 9. The wooden head h of the bobbin B may be turned down, or when plastic is used it may be molded with a portion of reduced diameter at 16, adapted to receive the annulus 15 in snugly fitting relation thereon to hold it in place on the head. In other cases the annulus 15 may be cemented or otherwise secured fast on the head h of the bobbin.

Figs. 11 and 12 illustrate an annulus 20 of less diameter than that shown in Fig. 10 to adapt it to be inserted into an annular slit-like groove 22 in the head h with the teeth 21 projecting therefrom at an angle to the axis of the bobbin and downwardly at an angle to the radial face of the head.

Figure 13:
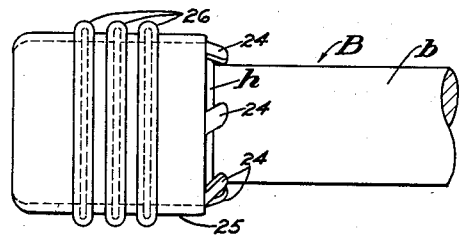
Fig. 13 is a view of still another method of forming the teeth or prongs for mounting them on the head of a bobbin.
Figure 14:
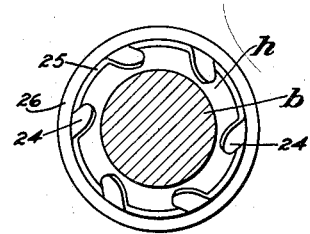
Fig. 14 is a part-sectional end view of the same.

Figs. 13 and 14 illustrate a still further modified form of construction of the invention in which the teeth or prongs 24 are formed integral with a sheet-metal sleeve 25 fitted to completely enclose the head h of the bobbin B. The sleeve 25 may be formed with the usual holding rings 26 projecting from its peripheral surface by shaping the metal in a die or like tool. With this form of construction the device is constructed and applied in one piece with both the rings 26 and the teeth 24 integral with the attaching element.

Figure 16:
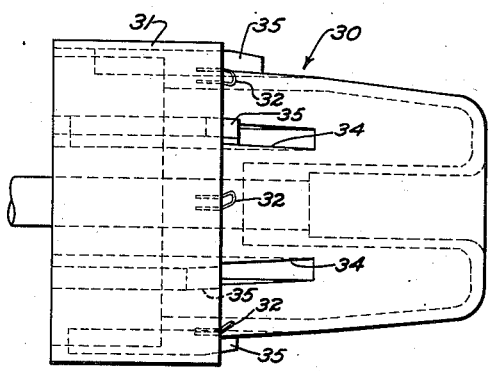
Fig. 16 shows the invention as applied to a rotary member or winding-on mandrel used for stripping the residue of yarn from partly exhausted bobbins.
Figure 17:
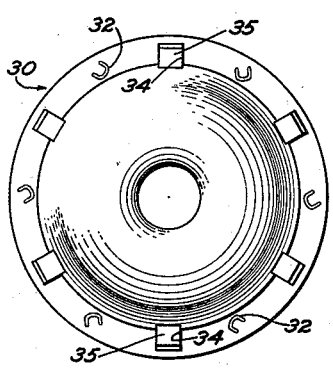
Fig. 17 is an end view of the same.

Figs. 16 and 17 illustrate a rotary mandrel for use in bobbin-stripping apparatus such as that shown and described in United States Letters Patent No. 2,638,937, dated May 19, 1953. The mandrel 30 is formed with a forward conical portion adapted to wind on a length of yarn to withdraw it from an exhausted filling bobbing to strip the latter for subsequent use in a filling winder. The mandrel 30 has an enlarged portion or hub 31 at one end forming an abrupt shoulder with its conical forward portion. Staples 32 are driven into the enlargement at an angle approximately 45° to a radial plane passing therethrough, see Fig. 17, and their projecting ends then bent over to stand at an angle of substantially 45° to the flat radial face of the hub 31. The conical portion of the mandrel 30 may be formed with parallel slots 34 in its periphery extending into its enlarged hub 31 and adapted to receive reciprocable pusher bars 35. The members 35 act to push the coils of yarn off from the end of the conical portion of the mandrel as it accumulates thereon to prevent it from building up into a considerable mass.

Figure 15:
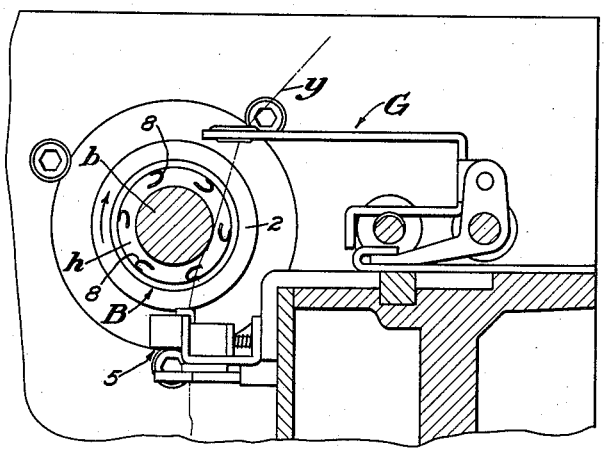
Fig. 15 is an end elevational view of the elements of the winding machine shown in Fig. 1 illustrating the means for carrying the yarn strand along the barrel of the bobbin into position to be gripped by the prongs on its head to attach the end of the yarn thereto.

The method of operation of the present improved device is explained as follows: Referring to Figs. 1 and 15 of the drawings, after a new bobbin B has been donned between the spindle-centers 2 and 4 it is immediately started to rotate and meanwhile during the doffing of the completed bobbin the yarn y leading from the supply through the yarn-guide G is seized by the clip 5 and carried back towards the head of the bobbin as the clip slides therealong. It will be observed by reference to Fig. 15 that the bobbin B rotates clockwise and the strand of yarn y is drawn down from the yarn-guide G across the rearward face of the barrel of the bobbin as said guide moves with the clip 5 towards the head of the bobbin. As the strand is brought up against the head of the bobbin on the rearward side of its barrel one of the teeth 8 will engage thereacross and as the end of the strand is released from the clip, which is opened at this point, the end will be carried around the barrel of the bobbin and attached thereto. After one tooth has engaged across the strand for holding its end the following teeth in the circle will pass thereunder without engaging with the yarn. Should the first tooth passing the strand fail to catch the yarn and carry it around the next succeeding tooth will engage with it to carry it around to attach it to the bobbin.

It will now be understood why the staples or other elements forming the teeth for gripping the yarn are disposed at an angle to the radial face of the head of the bobbin and to its axis, this arrangement being such that when one tooth has gripped the strand the remaining teeth will ride thereunder with a sort of camming action. It has been proved by numerous tests that with the present improved device the yarn will invariably be caught and drawn around the barrel of the bobbin to fasten it thereto with absolutely no skips or failures. In other words, the device acts with the utmost efficiency to positively catch and seize the end of the yarn and attach it to the bobbin or other core for winding it thereon.

The modified form of device illustrated in Figs. 16 and 17 of the present drawings is used in a manner as next explained. As a bobbin is dropped into the stripping apparatus its trailing length of yarn is drawn across the tapered portion of the mandrel 30 and carried towards its enlarged hub 31 so that the rotation of the mandrel will cause one of the teeth 32 to seize the strand. The yarn is thus held and attached to the mandrel to wind it thereon for uncoiling it from a bobbin containing a residue left when it is discharged from the loom. Thus the device acts in the same manner as explained above to provide reliable means for attaching the trailing end of yarn from a spent bobbin to a rotary mandrel for withdrawing it to strip the bobbin.

While the invention is herein shown and described in several different forms, it is to be understood that further variations may be made in its construction and arrangement without departing from the scope of the appended claims. Therefore, without limiting myself in this respect, I claim:

1. In a bobbin for holding filling yarn wound thereon and having a cylindrical head at one end with a relatively long barrel of less diameter than the head projecting axially therefrom, the combination of a plurality of pronglike elements located at intervals around said head and projecting from its end in overlying spaced relation to the peripheral surface of said barrel, said elements being inclined toward the axis of the bobbin and also inclined to cross said axis at an angle in the direction of rotation of said bobbin to adapt them to engage with a strand of yarn sliding along said barrel toward said head for attaching the end of said yarn to the barrel.

2. In a bobbin for holding filling yarn wound thereon comprising a relatively long barrel with a cylindrical head at one end of greater diameter than said barrel to provide a shouldered connection with said barrel, the combination therewith of a plurality of relatively flat prongs inserted in the shouldered end of said head with portions thereof projecting therefrom in overlying spaced relation to the periphery of said barrel, said prongs inclined toward the axis of the bobbin and also inclined to extend across said axis in the direction of rotation of said bobbin to adapt them to engage a strand of yarn sliding along said barrel toward said head for attaching the end of said yarn to the bobbin.

3. In a bobbin for holding filling yarn wound thereon comprising a cylindrical head with a relatively long barrel of less diameter extending axially from said head to provide a substantially radial shoulder at the end of said head where it joins said barrel, the combination therewith of a plurality of U-shaped staples having parallel legs inserted into the shoulder of said head and arranged in spaced relationship therearound, the connected end-portions of said legs projecting from said head in overlying spaced relation to the periphery of said barrel with all of said projecting portions inclined inwardly toward the axis of the barrel, said projecting portions of the staples also inclined to cross the axis of said barrel in the direction of rotation of the bobbin.

References Cited in the file of this patent

UNITED STATES PATENTS

| | | |
|---|---|---|
| 1,648,437 | Anderson | Nov. 8, 1927 |
| 2,056,342 | Bunker et al. | Oct. 6, 1936 |
| 2,614,771 | Goodhue | Oct. 21, 1952 |

FOREIGN PATENTS

| | | |
|---|---|---|
| 585,734 | Great Britain | Feb. 21, 1947 |